(12) United States Patent
Earl

(10) Patent No.: US 9,239,038 B2
(45) Date of Patent: Jan. 19, 2016

(54) POWER GENERATION APPARATUS

(71) Applicant: Fourivers Power Engineering Pty Ltd., Ormiston, Queensland (AU)

(72) Inventor: Russell Earl, Ormiston (AU)

(73) Assignee: FOURIVERS POWER ENGINEERING PTY LTD (AU)

(*) Notice: Subject to any disclaimer, the term of this patent is extended or adjusted under 35 U.S.C. 154(b) by 0 days.

(21) Appl. No.: 14/167,137

(22) Filed: Jan. 29, 2014

(65) Prior Publication Data
US 2014/0145446 A1 May 29, 2014

Related U.S. Application Data

(60) Division of application No. 13/030,641, filed on Feb. 18, 2011, now Pat. No. 8,659,180, which is a continuation-in-part of application No. PCT/AU2009/001085, filed on Aug. 24, 2009, and a continuation-in-part of application No. PCT/AU2008/001247, filed on Aug. 22, 2008.

(51) Int. Cl.
*F03B 13/00* (2006.01)
*H02P 9/04* (2006.01)
(Continued)

(52) U.S. Cl.
CPC . *F03B 13/10* (2013.01); *E02B 9/08* (2013.01); *F03B 17/063* (2013.01); *F03D 9/008* (2013.01); *F05B 2240/95* (2013.01); *Y02E 10/28* (2013.01); *Y02E 10/38* (2013.01); *Y02E 10/72* (2013.01)

(58) Field of Classification Search
CPC .................................................. F16H 57/0431

USPC ...................................................... 290/43, 54
See application file for complete search history.

(56) References Cited

U.S. PATENT DOCUMENTS 326,718 A   9/1885 Collins .......................... 415/61
419,345 A   1/1890 Otto .............................. 415/4.2
(Continued)

FOREIGN PATENT DOCUMENTS

EP    1879280 A1    1/2008
FR    2811720 A1    1/2002
(Continued)

OTHER PUBLICATIONS

International Search Report for PCT/AU2008/001247 (Date of Search Jan. 6, 2009).
(Continued)

*Primary Examiner* — Pedro J Cuevas
(74) *Attorney, Agent, or Firm* — Flaster/Greenberg P.C.

(57) ABSTRACT

A marine power generation apparatus is provided for generating power from an ocean current. The apparatus includes a turbine operable to generate power when within an ocean current. The turbine includes a pair of turbine blade assemblies each having a hub, a set of turbine spokes, stays or blades extending radially from the hub; and a circumferential ring extending around and connected to an outer periphery of the set of turbine spokes, stays or blades. The pair of turbine blade assemblies is mounted for same-direction rotation when placed in an ocean current and each being coupled with a common turbine shaft or a turbine shaft assembly. In addition, the turbine shaft is coupled along a shared axis with a rotor or an electrical generator. Means is also provided for anchoring the power generation means relative to a floor of the ocean and in alignment with the ocean current.

4 Claims, 11 Drawing Sheets

(51) Int. Cl.
*F03B 13/10* (2006.01)
*E02B 9/08* (2006.01)
*F03B 17/06* (2006.01)
*F03D 9/00* (2006.01)

(56) References Cited

U.S. PATENT DOCUMENTS

| | | | |
|---|---|---|---|
| 436,595 A | 9/1890 | Collins | 416/119 |
| 1,441,788 A | 1/1923 | Coninck | 416/193 R |
| 1,502,083 A | 7/1924 | Zoelly | 74/464 |
| 2,335,817 A | 11/1943 | Topalov | 415/4.4 |
| 2,379,324 A | 6/1945 | Topalov | 415/4.2 |
| 3,424,022 A | 1/1969 | Greenberg et al. | 74/409 |
| 3,822,607 A | 7/1974 | Tharaldsen | 74/468 |
| 3,928,771 A | 12/1975 | Straumsnes | 290/43 |
| 4,074,951 A | 2/1978 | Hudson | 415/2.1 |
| 4,088,419 A | 5/1978 | Hope et al. | 415/4.4 |
| 4,156,580 A | 5/1979 | Pohl | 415/4.2 |
| 4,174,923 A | 11/1979 | Williamson | 415/211.1 |
| 4,219,303 A | 8/1980 | Mouton, Jr. et al. | 415/7 |
| 4,236,866 A | 12/1980 | Martinez | 415/4.4 |
| 4,306,157 A | 12/1981 | Wracsaricht | 290/54 |
| 4,367,413 A * | 1/1983 | Nair | 290/52 |
| 4,383,182 A | 5/1983 | Bowley | 290/43 |
| 4,557,155 A | 12/1985 | Kopatz | 475/159 |
| 4,613,279 A | 9/1986 | Corren et al. | 415/121.2 |
| 4,625,124 A | 11/1986 | Ching-An | 290/42 |
| 4,720,640 A * | 1/1988 | Anderson et al. | 290/43 |
| 4,764,683 A | 8/1988 | Coombes | 290/55 |
| 4,850,190 A | 7/1989 | Pitts | 60/398 |
| 4,864,152 A | 9/1989 | Pedersen | 290/53 |
| 4,960,363 A | 10/1990 | Bergstein | 415/3.1 |
| 5,250,180 A | 10/1993 | Chang | 210/375 |
| 5,440,176 A | 8/1995 | Haining | 290/54 |
| 5,622,239 A | 4/1997 | Orlitzky | 184/6.12 |
| 5,850,108 A | 12/1998 | Bernard | 290/54 |
| 5,950,764 A | 9/1999 | Helbig | 184/105.1 |
| 5,969,430 A | 10/1999 | Forrey | 290/54 |
| 5,982,046 A | 11/1999 | Minh | 290/55 |
| 6,091,161 A | 7/2000 | Dehlsen et al. | 290/43 |
| 6,098,753 A | 8/2000 | Lamarre et al. | 184/6.11 |
| 6,109,863 A | 8/2000 | Milliken | 415/1 |
| 6,310,406 B1 | 10/2001 | Van Berkel | 290/43 |
| 6,531,788 B2 | 3/2003 | Robson | 290/43 |
| 6,674,181 B2 | 1/2004 | Harbison | 290/55 |
| 6,756,695 B2 | 6/2004 | Hibbs et al. | 290/42 |
| 6,923,622 B1 | 8/2005 | Dehlsen | 416/87 |
| 6,942,454 B2 | 9/2005 | Ohlmann | 416/11 |
| 6,951,443 B1 | 10/2005 | Blakemore | 415/4.3 |
| 7,063,579 B2 * | 6/2006 | Voves | B63B 35/44 290/54 |
| 7,291,936 B1 | 11/2007 | Robson | 290/43 |
| 7,307,356 B2 | 12/2007 | Fraenkel | 290/54 |
| 7,471,006 B2 | 12/2008 | Janca et al. | 290/43 |
| 7,471,009 B2 * | 12/2008 | Davis et al. | 290/54 |
| 7,530,224 B2 | 5/2009 | Fraenkel | 60/398 |
| 7,649,275 B2 | 1/2010 | Janca et al. | 290/43 |
| 7,682,126 B2 | 3/2010 | Parker | 415/3.1 |
| 7,728,446 B2 | 6/2010 | Hofbauer et al. | 290/1 A |
| 7,851,936 B2 | 12/2010 | Bolin | 290/54 |
| 8,022,567 B2 * | 9/2011 | Davis et al. | 290/54 |
| 8,047,332 B2 | 11/2011 | Salmela et al. | 184/6.12 |
| 8,057,159 B2 | 11/2011 | Chong | 415/4.2 |
| 8,171,815 B2 | 5/2012 | Paluncic et al. | 74/467 |
| 8,219,257 B2 | 7/2012 | Hunt | 700/288 |
| 8,237,304 B2 | 8/2012 | Dehlsen et al. | 290/54 |
| 8,256,318 B2 | 9/2012 | Vassaux | 74/468 |
| 8,258,645 B2 * | 9/2012 | Barber | 290/55 |
| 8,264,096 B2 | 9/2012 | Micu | 290/55 |
| 8,272,990 B2 | 9/2012 | Hagedorn et al. | 475/331 |
| 8,288,882 B2 | 10/2012 | Bolin | 290/54 |
| 8,294,290 B2 * | 10/2012 | da Silva | 290/52 |
| 8,432,056 B2 | 4/2013 | Bailey et al. | 290/54 |
| 8,466,595 B2 * | 6/2013 | Spooner | 310/216.002 |
| 8,497,594 B2 | 7/2013 | Rajadhyaksha et al. | 290/53 |
| 8,525,363 B2 | 9/2013 | Rajadhyaksha et al. | 290/53 |
| 8,531,052 B1 | 9/2013 | Simnacher | 290/55 |
| 8,674,538 B2 * | 3/2014 | Lugg | 290/55 |
| 8,786,120 B2 * | 7/2014 | da Silva | 290/52 |
| 8,829,704 B2 * | 9/2014 | Grigg | 290/54 |
| 9,051,913 B2 * | 6/2015 | Feiler | F03B 11/02 |
| 2002/0088222 A1 | 7/2002 | Vauthier | 60/398 |
| 2002/0158472 A1 | 10/2002 | Robson | 290/43 |
| 2003/0235493 A1 * | 12/2003 | Keyvani | 415/4.1 |
| 2005/0121917 A1 | 6/2005 | Kikuchi | 290/53 |
| 2005/0285407 A1 * | 12/2005 | Davis et al. | 290/54 |
| 2006/0053922 A1 | 3/2006 | Laabs | 74/467 |
| 2006/0125242 A1 | 6/2006 | Fraenkel | 290/54 |
| 2006/0138777 A1 | 6/2006 | Hofbauer et al. | 290/1 R |
| 2006/0192389 A1 | 8/2006 | Perry et al. | 290/43 |
| 2006/0251516 A1 | 11/2006 | Sohn | 416/132 B |
| 2007/0018459 A1 | 1/2007 | Williams | 290/54 |
| 2007/0175706 A1 | 8/2007 | Shilo et al. | 184/6.12 |
| 2007/0241566 A1 | 10/2007 | Kuehnle | 290/53 |
| 2007/0257492 A1 | 11/2007 | Robson | 290/34 |
| 2007/0293365 A1 | 12/2007 | Thoma | 475/331 |
| 2008/0012345 A1 | 1/2008 | Parker | 290/54 |
| 2008/0018115 A1 | 1/2008 | Orlov | 290/54 |
| 2008/0276743 A1 | 11/2008 | Salmela et al. | 74/467 |
| 2009/0078075 A1 | 3/2009 | Vassaux | 74/468 |
| 2009/0091135 A1 | 4/2009 | Janca et al. | 290/54 |
| 2009/0140524 A1 | 6/2009 | Kejha | 290/54 |
| 2009/0243300 A1 * | 10/2009 | Davis et al. | 290/54 |
| 2010/0000358 A1 | 1/2010 | Paluncic et al. | 74/468 |
| 2010/0007148 A1 * | 1/2010 | Davis et al. | 290/54 |
| 2010/0026002 A1 * | 2/2010 | Spooner | 290/54 |
| 2010/0101352 A1 | 4/2010 | Paluncic et al. | 74/467 |
| 2010/0181774 A1 | 7/2010 | Dehlsen et al. | 290/54 |
| 2010/0225118 A1 | 9/2010 | Micu | 290/55 |
| 2010/0230971 A1 | 9/2010 | Mackie | 290/54 |
| 2010/0232962 A1 | 9/2010 | Bolin | 416/85 |
| 2010/0266407 A1 * | 10/2010 | Barber | 416/85 |
| 2010/0276935 A1 | 11/2010 | Dehlsen et al. | 290/54 |
| 2010/0290900 A1 * | 11/2010 | Krouse | 415/182.1 |
| 2010/0295307 A1 | 11/2010 | Barber | 290/52 |
| 2011/0006534 A1 | 1/2011 | Achard et al. | 290/54 |
| 2011/0031760 A1 * | 2/2011 | Lugg | 290/55 |
| 2011/0095530 A1 * | 4/2011 | Blumer | F03B 17/061 290/43 |
| 2011/0254275 A1 | 10/2011 | Joseph | 290/53 |
| 2012/0013128 A1 * | 1/2012 | Duke | F03B 13/10 290/54 |
| 2013/0043685 A1 * | 2/2013 | Sireli et al. | 290/54 |
| 2013/0249216 A1 | 9/2013 | Chauvin | 290/54 |
| 2013/0285382 A1 * | 10/2013 | Grigg | 290/54 |
| 2014/0271183 A1 * | 9/2014 | Barber | 416/1 |
| 2015/0130191 A1 * | 5/2015 | Houvener | H02K 7/1853 290/1 A |
| 2015/0145259 A1 * | 5/2015 | Kehr | H02K 7/1823 290/54 |
| 2015/0295481 A1 * | 10/2015 | Harris | H02K 16/005 290/43 |

FOREIGN PATENT DOCUMENTS

| | | |
|---|---|---|
| JP | 05172036 A | 7/1993 |
| JP | 2001208173 A | 8/2001 |
| JP | 2001221141 A | 8/2001 |
| JP | 2002081362 A | 3/2002 |
| WO | 02099950 A1 | 12/2002 |
| WO | 03025385 A2 | 3/2003 |
| WO | 2006022551 A1 | 3/2006 |
| WO | 2008081187 A2 | 7/2008 |
| WO | 2009026620 A1 | 3/2009 |
| WO | 2010020018 A1 | 2/2010 |

OTHER PUBLICATIONS

International Search Report for PCT/AU2009/001085 (Date of Search Nov. 18, 2009).

Examination Report, AU 2012216624, date of report Mar. 7, 2014.

* cited by examiner

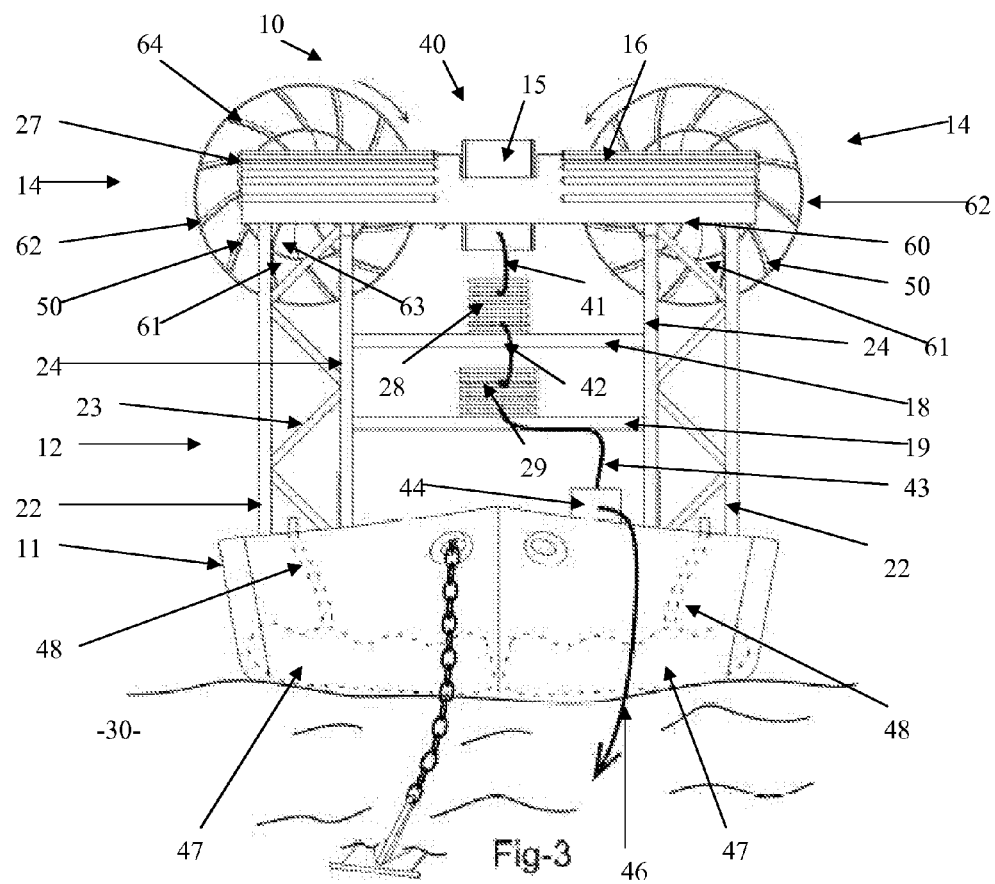
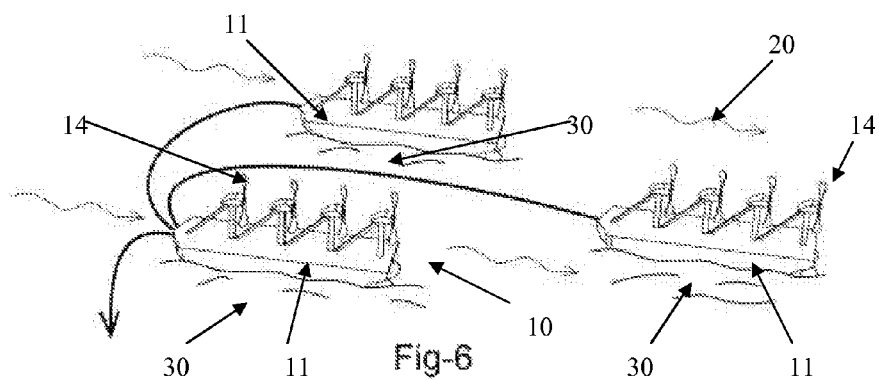

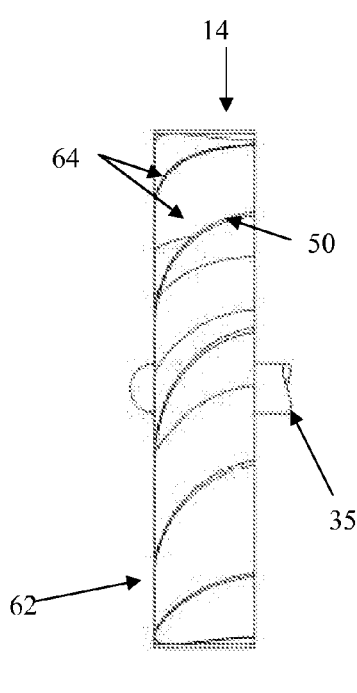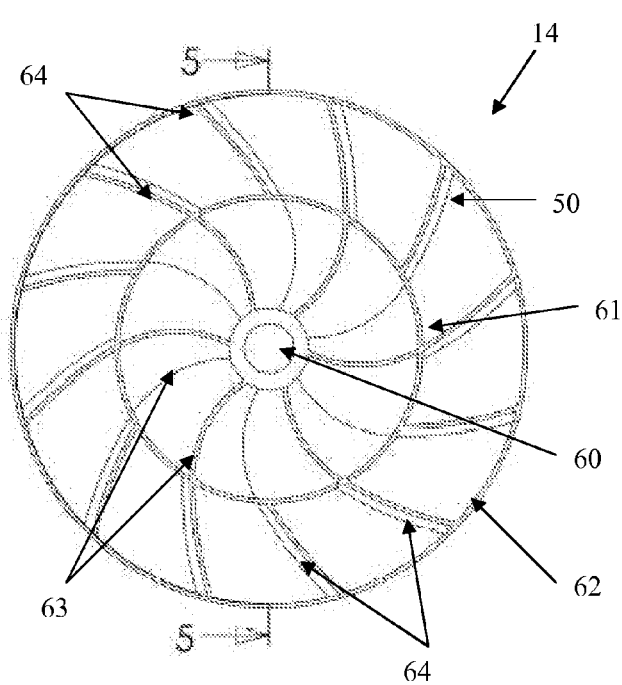
Fig-5
Fig-4

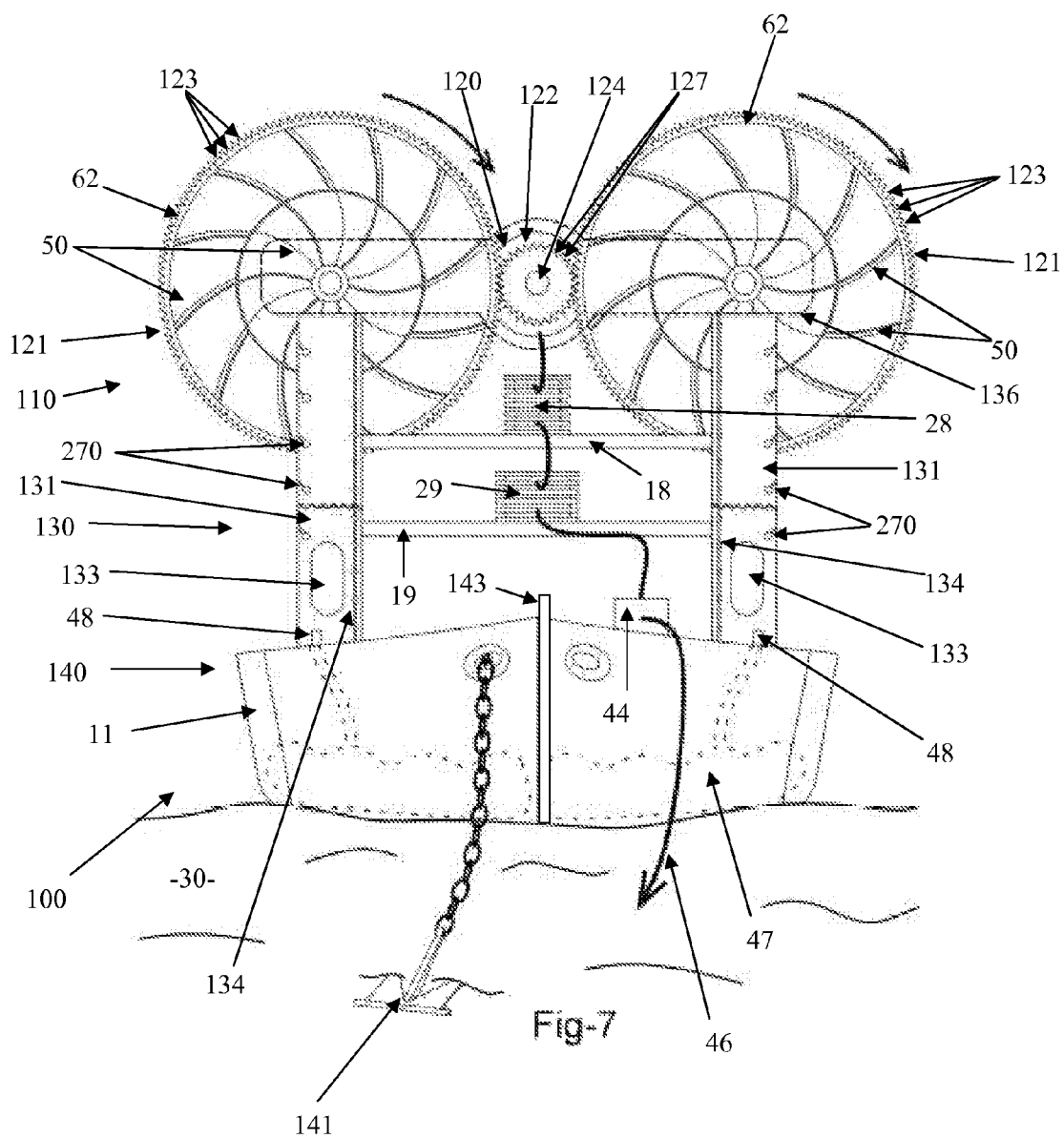

POWER GENERATION APPARATUS

RELATED APPLICATIONS

The present application is a divisional of U.S. application Ser. No. 13/030,641 filed 18 Feb. 2011, now U.S. Pat. No. 8,659,180, which is a continuation-in-part of International Application Number PCT/AU2009/001085, filed 24 Aug. 2009, and published as WO 2010/020018, which is a continuation in part of International Application Number PCT/AU2008/001247, filed 22 Aug. 2008, and published as WO 2009/026620. These two prior applications are herein incorporated by reference.

FIELD OF THE INVENTION

This invention relates to a marine power generation apparatus. In one aspect, the invention concerns an apparatus for generating power from ocean currents, particularly continuous low speed ocean currents.

BACKGROUND

Power generation from renewable energy sources has long been proposed as an eventual replacement or, at the very least, supplement for power generation from non-renewable energy sources. However, capturing energy from renewable sources has presented considerable challenges with the result that exploitation of such sources has been minimal. Ocean currents have been viewed as a possible renewable energy source, but few solutions for capturing such energy have been forthcoming, and fewer still that would be viable on a commercial scale.

An aim of the present invention is to provide a marine power generation apparatus which alleviates one or more of the problems of the prior art, or to provide the public with a useful or commercial choice. Other aims of the invention may become apparent from the following description.

It is to be understood that, if prior art is referred to herein, this reference does not necessarily constitute an admission that the prior art forms part of the common general knowledge in the art in Australia or in any other country.

Throughout this specification, the term "comprising" and its grammatical equivalents shall be taken to have an inclusive meaning unless the context of use indicates otherwise.

BRIEF DESCRIPTION OF THE INVENTION

According to a first aspect of the present invention, there is provided a marine power generation apparatus for generating power from an ocean current, said apparatus comprising:
power generation means operable to generate power when within an ocean current; and
anchoring means for anchoring the power generation means relative to a floor of the ocean and in alignment with the ocean current.

According to a second aspect of the present invention, there is provided a method of generating power from an ocean current, said method comprising the steps of:
(1) placing a marine power generation apparatus within an ocean current, wherein said apparatus comprises:
power generation means operable to generate power when within the ocean current; and
anchoring means for anchoring the power generation means relative to a floor of the ocean and in alignment with the ocean current; and (2) storing or transferring power generated by the power generation means.

The terms "ocean" and "ocean current" as used herein generally refer to any body of water having a current. That is, the terms should be interpreted as including other marine environments having a current, such as seas, rivers and man-made waterways.

The term "floor of the ocean" as used herein refers to an ocean floor or any other substantial mass located within a body of water/marine environment to which the apparatus can be securely anchored. The floor or mass can extend evenly, unevenly, horizontally, vertically or at any angle.

The anchoring means can be of any suitable size, shape and construction. The anchoring means can permanently anchor the apparatus to the ocean floor or temporarily or adjustably anchor the apparatus to the ocean floor.

In one embodiment, the anchoring means can comprise one or more boat anchors or other weights, such as metal or concrete blocks.

In another embodiment, the anchoring means can be in the form of a floodable vessel or barge. The floodable vessel can be used for transporting the generation means and the remainder of the apparatus to the appropriate site whereupon it can be flooded to sink, thereby immersing itself and the generation means in the ocean so that the generation means is positioned within the ocean current.

The floodable vessel can be provided with variable buoyancy means operable for refloating the apparatus for relocation, maintenance or such like. The buoyancy means can comprise gas-inflatable bags. Alternatively or additionally, the buoyancy means can also include one or more blow tubes extending through a hull of the vessel, the purpose of which is to provide a lifting force by forcing pressurised gas between a bottom surface of the vessel and the ocean floor. This may be achieved in any suitable way.

In yet another embodiment, the anchoring means can further comprise structural support means for supporting the power generation means at a fixed position relative to the ocean floor and for supporting the power generation means in alignment with the ocean current. Alternatively, the support means can be regarded as a separate feature of the present marine power generation apparatus. For clarity, hereafter, the support means will be regarded as an independent feature of the present marine power generation apparatus.

The power generation means is provided in such form as to take advantage of the features of ocean currents to generate power by virtue of the relative motion between the generation means and the body of water within which the generation means is immersed. The fluid motion of the ocean current can be converted into mechanical motion for the generation of power according to known power generation principles. The mechanical motion can be initiated and maintained by paddles, propellers, marine screws, turbines or such like including hybrid and/or combined arrangements.

Power generated can be stored or transferred to a suitable location by insulated conductors extending from the power generation means to a desired collection site for power conditioning as may be required before distribution to a power grid. In a preferred embodiment of the invention, the power generation apparatus generates AC power. This power can be converted to DC signal using any suitable technique and/or equipment (such as, but not limited to, one or more rectifiers). In embodiments of the invention in which the AC signal is rectified, the one or more rectifiers can be located at any suitable location. For instance, the one or more rectifiers can be associated with the power generation apparatus such that rectification of the AC signal takes place underwater. If desired, a further conversion of the DC signal to AC can take place on shore using any suitable technique and/or equipment, such as an inverter for attachment into the national grid. Generated voltages can be transformed up to high transmission voltages before rectification to reduce long distance transmission losses.

In all aspects of the invention, it will be understood that the speed of an ocean current is relatively low when compared with, for instance, wind speed encountered in wind power generation apparatus. The ocean current speed may be greater than 10 knots, but is preferably less than about 10 knots, and more preferably between about 3 and 10 knots.

Preferably, the power generation means comprises at least one turbine coupled with at least one generator (alternator), such as the type having a rotor and a stator. The generator can comprise an airtight housing for the stator, and the housing can be of any suitable size, shape and construction.

In one embodiment, the power generation means comprises at least one turbine comprising a turbine blade assembly, and a turbine shaft assembly coupled with the blade assembly and with a rotor of an electrical generator.

A turbine shaft of the turbine shaft assembly can be of any suitable size, shape and construction. It can be coupled with the turbine blade assembly and coupled with the rotor of the generator in any suitable way. It can be coupled with the rotor of the generator directly or by way of a gear box and or other gear train. Preferably, a longitudinal axis of the turbine shaft is substantially aligned with the direction of ocean current flow when the turbine is in use.

A drive train can be provided between the generator and turbine blade assembly including a set of bevel gears to turn the rotary motion of the turbine blade assembly through 90° and a gear box associated the set of bevel gears to gear up the angular velocity of rotation to a speed suitable for power generation.

The turbine blade assembly can be of any suitable size, shape and construction. The turbine blade assembly can comprise a hub and any suitable number of spokes, stays and/or blades extending radially from the hub so as to provide a current-capturing face. Preferably, the turbine blade assembly comprises a plurality of turbine blades extending radially from the hub at an angle of approximately 45° relative to the direction of flow of the ocean current. Preferably, one or more of the blades or opposing pairs of blades are curved to maximise the water's thrust on the blades.

It has been discovered by the inventor that the turbine blade assembly when in a "paddle wheel" type configuration as described below (i.e. with one or two concentric circumferential rings or even further concentric circumferential rings) is better able to withstand the high torque experienced in ocean currents than conventional propeller-type blades, which may fail due to the accumulation of mechanical stresses at their base in high torque environments.

In one embodiment, the turbine blade assembly can comprise a first set of turbine blades, spokes or stays extending radially from a hub and a first circumferential ring or other type of annular member extending around and connected to an outer periphery of the first set of turbine blades. The circumferential ring may be in the form of a tube having an axis extending substantially co-axially with the longitudinal axis of the turbine shaft.

The turbine blade assembly can comprise a second set of turbine blades extending radially from the first circumferential ring or annular member, and a second circumferential ring or other type of annular member extending around and connected to an outer periphery of the second set of turbine blades. The second circumferential ring may be in the form of a tube that is concentric with the first circumferential ring. The turbine blade assembly can comprise further sets of turbine blades extending radially from the second circumferential ring or annular member, and further circumferential rings or other types of annular members extending around those further sets of blades.

Preferably the turbine blades are shaped to capture as much of the kinetic energy of the passing current as possible in order to convert that energy to power. Thus, it is preferred that the turbine blades are dimensioned and spaced relative to one another such that they cover more than 50% of the current-capturing face of the blade assembly. More preferably, the turbine blades cover more than 70% of the cross-sectional area of the current-capturing face. Most preferably, the turbine blades cover more than 90% of the cross-sectional area of the current-capturing face. In this way, the vast majority of the kinetic energy of the passing current can be captured by the turbine blades.

In another embodiment of the invention, the power generation means comprises a pair of turbines comprising a pair of turbine blade assemblies (preferably in a paddle wheel configuration) each coupled with a respective turbine shaft assembly and mounted for contra-rotation relative to one another. Each turbine shaft of the turbine shaft assembly can be further coupled with a separate electrical generator or the same electrical generator. If the same electrical generator, each turbine shaft can be coupled with that generator by way of a gearbox and/or gear train and a rotor drive shaft.

In such form, the turbine blade assemblies (preferably in a paddle wheel configuration) are arranged for contra-rotation with respect to one another in order to substantially eliminate torque effects on the apparatus. The axes of rotation are generally in line with the direction of flow of the ocean current in which the apparatus is immersed. The turbines are preferably arranged for slow rotation in view of the relatively slow ocean current, but high torque.

In another embodiment of the present invention, the power generation means comprises a turbine and an electrical generator, with said turbine comprising a pair of turbine blade assemblies mounted for same-direction rotation when placed in an ocean current and each being coupled with a common turbine shaft of a turbine shaft assembly, and said turbine shaft being coupled along a shared axis with a rotor of an electrical generator.

The turbine blade assemblies according to this embodiment can be coupled with the common turbine shaft in any suitable way. In one embodiment, the turbine shaft assembly further comprises a turbine shaft gear connected to an end of the turbine shaft, each said blade assembly has a toothed outer periphery (like a gear), and the toothed outer peripheries mesh with teeth of the turbine shaft gear (i.e. a gear train). In this way, the blade assemblies and rotor can rotate in unison.

In an alternative embodiment of the invention, the turbine shaft gear may be in the form of a sprocket, the teeth of which are adapted to engage with one or more recesses provided in the outer periphery of the turbine blade assemblies. In some embodiments, the turbine shaft gear may be provided with a plurality of rows of teeth, such that a multiple sprocket arrangement is formed.

In another embodiment, the outer periphery of the turbine blade assemblies may be provided with one or more sprocket engagement means, such as one or more endless chains, attached to the outer periphery. The sprocket engagement means may be provided such that rotation of the turbine blade assemblies results in an engagement between the sprocket and the sprocket engagement means, thereby causing rotation of the turbine shaft gear.

In some embodiments, the turbine shaft gear may be provided with a plurality of sprockets. In this embodiment, one or more of the sprockets may engage with the sprocket engagement means on each of the turbine blade assemblies.

A skilled addressee will understand that that sprocket engagement means could equally be provided on the turbine shaft gear, while the sprockets may be provided on the outer periphery of the turbine blade assemblies. Alternatively, the turbine shaft gear may be provided with sprocket engagement means adapted to engage with a sprocket on a first of the turbine blade assemblies, and a sprocket adapted to engage with sprocket engagement means on a second of the turbine blade assemblies.

In a further embodiment of the invention, the turbine shaft gear (and, in particular, the point at which the turbine shaft gear and the turbine blade assemblies mesh) may be provided with a cover. The cover may be of any suitable form, although in a preferred embodiment of the invention, the cover is adapted to prevent access by humans, marine life, or debris to the point at which the turbine shaft gear and the turbine blade assemblies mesh and create a pinch point.

In some embodiments, the cover may be a solid cover, while in other embodiments the cover may be a wire or mesh cover. Preferably, the aperture size of the wire or mesh is large enough such that a flow of water through the device is allowed, while relatively large marine life and debris is prevented from passing through the apertures.

The turbine blade assembly can be in a paddle wheel type configuration (i.e. having one or two concentric rings) as described above but having toothed outer peripheries. In this configuration, the inventor has discovered that the turbine blades can be many meters in length and/or wide and that the thickness of the turbine blades may be reduced. In some embodiments, the turbine blades can be several meters in (radial) length, about 20 meters in length or even longer. That is, in some embodiments the current-capturing face can have a diameter of say, 3 meters, 10 meters, 20 meters, 30 meters, 40 meters, 50 meters or even greater. Preferably, the turbine blades are no more than about 100 mm thick. More preferably, the turbine blades are no more than about 50 mm thick. Most preferably, the turbine blades are no more than about 20-25 mm thick.

According to a first preferred aspect of the present invention, there is provided a turbine for use in a marine power generation apparatus, said turbine comprising a turbine shaft and a turbine blade assembly, wherein said turbine blade assembly comprises:
  a hub;
  a set of turbine spokes, stays or blades extending radially from the hub; and
  a circumferential ring extending around and connected to an outer periphery of the set of turbine spokes, stays or blades.

According to a second preferred aspect of the present invention, there is provided a turbine for use in a marine power generation apparatus, said turbine comprising a turbine shaft coupled to a turbine blade assembly, wherein said turbine blade assembly comprises:
  a hub;
  a first set of turbine spokes, stays or blades extending radially from the hub;
  a first circumferential ring extending around and connected to an outer periphery of the first set of turbine spokes, stays or blades;
  a second set of turbine spokes, stays or blades extending radially from the first circumferential ring; and
  a second circumferential ring concentric with the first circumferential ring and extending around and connected to an outer periphery of the second set of turbine spokes, stays or blades.

According to a third preferred aspect of the present invention, there is provided a power generation means comprising a turbine and an electrical generator, with said turbine comprising a pair of turbine blade assemblies mounted for same-direction rotation when placed in an ocean current and each being coupled with a common turbine shaft of a turbine shaft assembly, and said turbine shaft being coupled along a shared axis with a rotor of an electrical generator.

These first, second and third preferred aspects can have additional features of the invention as generally described elsewhere in this specification.

The marine power generation apparatus can further comprise a cooling system for cooling the generator. Any suitable type of cooling system can be used.

In one embodiment, the cooling system comprises a pump and a manifold extending from an outlet of the pump around a stator of the generator such that cooling fluid located within the manifold is in a heat exchange relationship with the stator. The pump may be coupled with and driven by the turbine shaft, and convey cooling fluid, such as ocean water, through the manifold. The pump can have an inlet for ocean water and the manifold can have an outlet for ocean water.

In another embodiment, the cooling system comprises a pump for pumping cooling fluid, such as ocean water, through a hollow turbine shaft so as to have a cooling effect on the generator rotor. The pump may be coupled with and driven by the turbine shaft. An outlet of the pump can be coupled with the hollow turbine shaft by way of a swivel coupling.

In yet another embodiment, the cooling system additionally or alternatively comprises an ocean water-cooled radiator and fan arranged in such a fashion as to circulate cooled air throughout the generator housing, so as to cool the stator and rotor.

The marine power generation apparatus can further comprise a lubricating system for providing lubricant between contacting surfaces of the meshed turbine assemblies and the turbine shaft gear of the turbine shaft assembly. Any suitable type of lubricating system can be used.

In one embodiment, the lubricating system comprises a pump for pumping high-pressure lubricant, such as ocean water, through a hollow turbine shaft and through outlets in teeth of the turbine shaft gear of the turbine shaft assembly. The teeth of the turbine shaft gear can have any suitable number of outlets and the outlets can be of any suitable size and shape. The outlets can extend (as galleries) between contact surfaces of a gear tooth to the hollow turbine shaft. The pump may be coupled with and driven by the turbine shaft. An outlet of the pump can be coupled with the hollow turbine shaft by way of a swivel coupling. The pump of the cooling system and lubricating system can be one and the same.

The support means can be of any suitable size, shape and construction. The support means can support the power generation means and can be connected to the anchoring means in any suitable away.

In one embodiment, the support means comprises a framework of frame members that support a housing for the generator and the turbine/s. The housing for the generator and the turbine/s can be of any suitable size, shape and construction. It can be shaped so as to minimise ocean current drag. For example, the housing can have wings extending generally across the ocean current.

In one embodiment, some of the frame members are tubular, that is, hollow. Hollow upright frame members may extend from the housing of the generator to the anchoring means, which may be a floodable vessel. The upright frame members can provide personnel access to the housing of the generator via portals located adjacent the anchoring means and internal passages and step ladders of the frame members. In place of a step ladder, there may be a pneumatic personnel lift. The portals may remain open even when the apparatus is fully submerged.

The marine power generation apparatus can further comprise a leak prevention means for preventing the generator as well as perhaps other machinery from becoming flooded with ocean water. The leak prevention means can be of any suitable construction.

In one embodiment, the leak prevention means includes a least one sensor electrically connected to a source of pressurised gas that, when sensing water within a housing for the generator, initiates pressurisation of the housing. Preferably, float switches are located within and are spaced along one or more of the upright frame members and are electrically coupled to a source of pressurised gas, such as air or nitrogen, for pressurising the housing should an influx of water occur. Upon sensing water within the upright frame members, the float switches can trigger pressurisation of the housing with gas and force the water level down the upright frame members towards the portals.

The gas may be provided from any suitable source. For instance, the gas may be pumped to the apparatus from a reservoir on shore, or one or more gas reservoirs may be provided on the apparatus itself.

The power generating apparatus can further comprise a current flow control surface formed to produce a force in reaction to the ocean current for urging the generation means in a predetermined direction with respect to the ocean current.

Preferably, the current flow control surface is formed to provide an uplifting force on the generation means in order to minimise loading on the support means. Preferably, the support means is a rigid support means capable of supporting the generation means irrespective of the load reduction produced by the current flow control surface. The uplifting force is preferably sufficient to provide stability such that the generation means is relatively buoyant in comparison with the anchoring means in order to maintain an upright operating perspective for the apparatus, particularly when raising or lowering the vessel for relocation or maintenance purposes.

In one embodiment, the generation means includes a generator mounted centrally to a frame to which a wing is also mounted to provide the current flow control surface. It is preferred that the frame and/or wing include conduits exposed to the flow of ocean current and through which coolant may flow for cooling the generator and/or other equipment. A drive train can be provided between the generator and paddle wheels including a set of bevel gears to turn the rotary motion of the paddle wheels through 90° and a gear box associated with each set of bevel gears to gear up the angular velocity of rotation to a speed suitable for power generation.

In another aspect, the invention resides broadly in a marine power generation apparatus for generating power from an ocean current, said apparatus comprising:
   a turbine operable to generate power when within an ocean current, the turbine comprising one or more turbine blade assemblies comprising:
      a hub;
      a set of turbine spokes, stays or blades extending radially from the hub; and
      a circumferential ring extending around and connected to an outer periphery of the set of turbine spokes, stays or blades;
   one or more magnetic means mounted thereto;
   wherein the one or more turbine blade assemblies are mounted for rotation when placed in an ocean current such that rotation of the one or more turbine blade assemblies causes the one or more magnetic means to pass adjacent to power generation means adapted to generate power from the one or more magnetic means; and
   wherein the marine power generation apparatus further comprises anchoring means for anchoring the turbine relative to a floor of the ocean and in alignment with the ocean current.

The magnetic means may be of any suitable form. In one embodiment of the invention, the magnetic means comprises a magnet; however, a skilled addressee will understand that the magnetic means may comprise an electromagnetic coil or the like. In some embodiments of the invention, the magnetic means may comprise a permanent magnetic, electrically-induced magnetic poles or the like, or a combination thereof.

In a preferred embodiment of the invention, the turbine assembly is provided with a plurality of magnetic means. In a more preferred embodiment, the plurality of magnetic means may be provided at locations on the turbine assembly equidistant from the hub, such that a ring of magnetic means is formed. The magnetic means may be spaced any suitable distance from one another around the ring, although in a preferred embodiment, the magnetic means are positioned adjacent one another such that a substantially continuous ring of magnetic means is formed. In this way, a substantially continuous generation of power may be achieved.

The power generation means may be of any suitable form. For instance, the power generation means may comprise one or more magnets, electromagnetic coils, static windings or the like. Preferably, the power generation means will be fixed in position such that the turbine blade assembly and magnetic means rotate relative to the power generation means.

In some embodiments, the power generation means may be mounted to support means extending between the anchoring means and the turbine. The power generation means may be fixed to the support means using any suitable technique.

The support means may serve as a housing for additional parts of the apparatus. For instance, the apparatus may include one or more rectifiers, transformers, batteries, control equipment (for instance, a PLC), electrical cabling or the like, or a combination thereof. The support means may be adapted to house any such pieces of equipment therein in a watertight fashion.

It is envisaged that, as the one or more magnetic means rotate to a position adjacent the power generation means, electrical power is generated. This power may either be an AC current or a DC current. In some embodiments, it is envisaged that the marine power generation apparatus may be operated in different ways to produce either a DC current or an AC current depending on the use to which the power is to be put.

The generated power may be used for any suitable purpose. For instance, the power may be stored in batteries or the like, fed directly into a power grid, transferred to a power station or used for a particular application (for instance, a generator, a desalination plant, domestic heating and/or lighting, operation of a land or ocean going vehicle or the like, or a combination thereof).

Alternatively, at least a portion of the generated power may be used to periodically switch the polarity of the magnetic means so as to produce AC power.

In some embodiments of the invention, the marine power generation apparatus may comprise a single turbine blade assembly. In an alternative embodiment of the invention, the marine power generation apparatus may comprise a plurality of turbine blade assemblies. In embodiments of the invention where a plurality of turbine blade assemblies is present, it is envisaged that each of the turbine blade assemblies may function independently of one another.

In all embodiments of the invention in which support means is present, it is envisaged that the support means may have the cross-sectional shape of an airfoil. In this embodiment of the invention, a narrow edge of the airfoil may be positioned in alignment with the ocean current so as to minimised the surface area of the support means exposed directly to the ocean current.

BRIEF DESCRIPTION OF THE DRAWINGS

Embodiments of the invention will be described with reference to the accompanying drawings in which:

FIG. 3 is an end view of the marine power generation apparatus of FIG. 1;

FIG. 4 is an end view of a paddle wheel of the marine power generation apparatus of FIG. 1;

FIG. 5 is a detailed side view of part of the paddle wheel shown in FIG. 4;

FIG. 6 is a side view of marine power generation apparatuses (similar to the one shown in FIG. 1) anchored to the ocean floor, as may be located in a path of an ocean current;

FIG. 7 is a detailed bow view of a marine power generation apparatus anchored to an ocean floor, according to another embodiment of the present invention;

FIG. 13b is a detailed perspective view of part of the marine power generation apparatus shown in FIG. 13a;

FIG. 14b is a detailed perspective view of part of the marine power generation apparatus shown in FIG. 14a.

DETAILED DESCRIPTION

Figure 1:
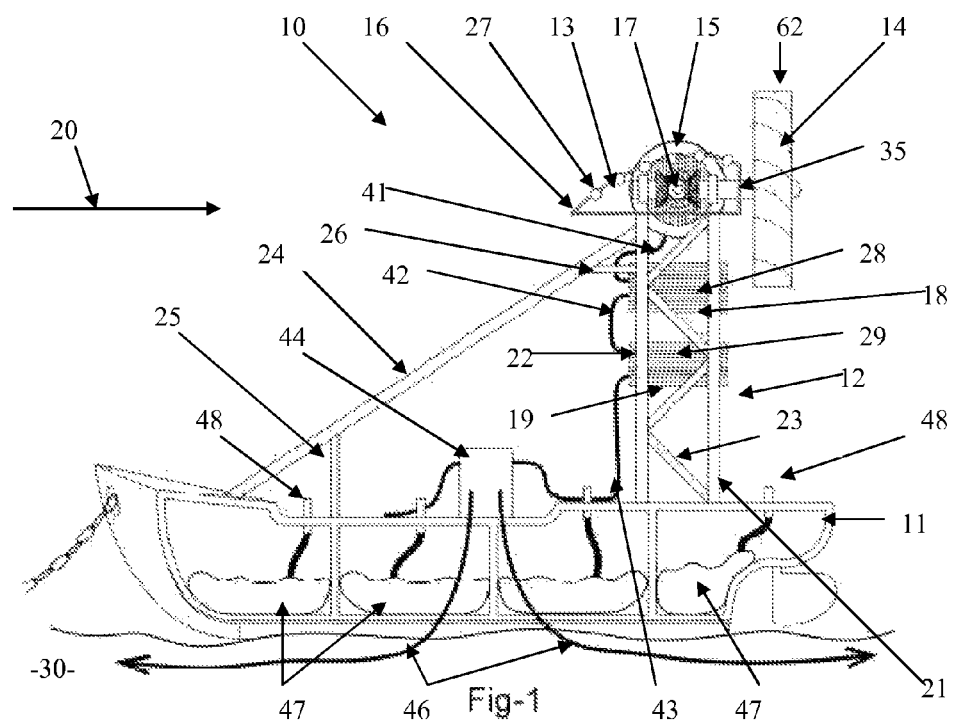
FIG. 1 is a detailed side view of a marine power generation apparatus anchored to an ocean floor, according to an embodiment of the present invention.
Figure 2:
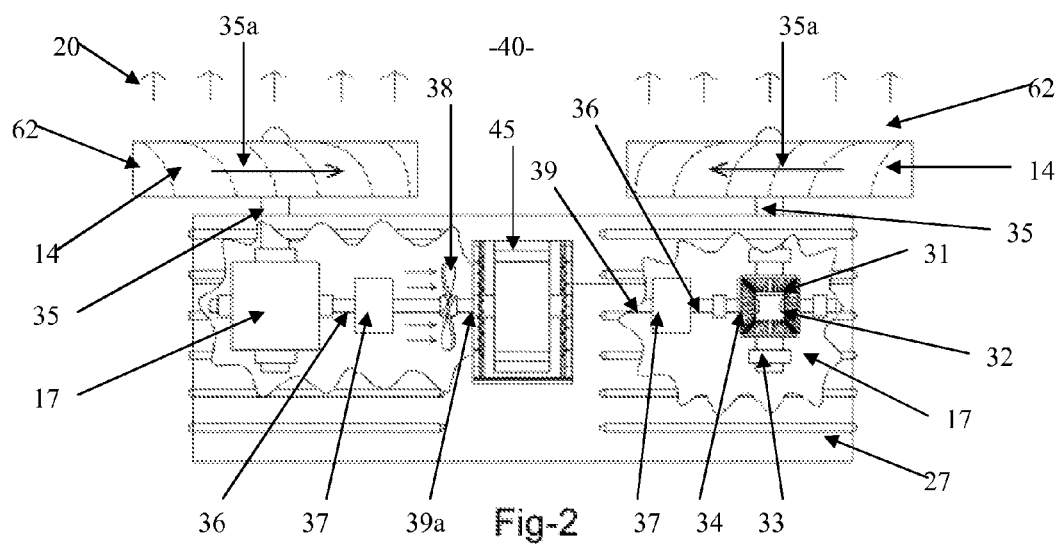
FIG. 2 is a detailed plan view of part of the marine power generation apparatus of FIG. 1.

It will be appreciated that the drawings have been provided for the purposes of illustrating preferred embodiments of the present invention and that the invention should not be considered to be limited solely to the features as shown in the drawings.

FIGS. 1 to 5 show a first embodiment of a marine power generation apparatus 10 anchored to an ocean floor 30, for generating power from low speed (about 3 to 10 knot) ocean currents 20. The apparatus 10 includes anchoring means 11, support means 12 and power generation means having paddle wheels 14 coupled with a generator 45.

The anchoring means 11 is in the form of an anchor vessel 11 (shown in cut-away view in FIG. 1) to which is mounted the support means 12 in the form of a support frame assembly 12. The anchor vessel 11 is a barge 11 having its scuttling valves opened to permit flooding and sinking of the barge 11 to sit on the ocean floor 30.

As seen in FIG. 1 or FIG. 3, the support frame assembly 12 includes two upright booms being in the form of a tubular hollow lattice boom having a pair of front chords 22 standing generally upright and parallel to a pair of rear chords 21 and mounted towards a stern of the barge 11. A set of struts shown typically at 23 provide bracing of the upright booms 21, 22. The upright booms are further stabilised by a pair of main struts 24 running from a top of the upright booms obliquely to a bow of the barge 11 each of which in turn is supported by a stay 25 near a lower end of the main strut 24 running substantially upright. A brace 26 is provided running horizontally between each main strut 24 and its associated upright boom near the top.

A wing assembly 13 is mounted atop of the upright booms, extends between them and extends laterally beyond them. A transformer support platform 18 is mounted to the upright booms to extend between them intermediate the wing assembly and the barge 11. A rectifier support platform 19 is mounted to the upright booms to extend between them intermediate the transformer support platform 18 and the barge 11.

The wing assembly 13 includes a control surface 16, which may be fixed or moveable, smooth or contoured. Irrespective of the configuration and/or disposition of the control surface 16 illustrated in FIG. 1, the control surface 16 can be formed to provide uplift to the wing assembly 13 and the generation means and thereby provide orientation stability during operation with the ocean current running in the direction of arrow 20. A series of cooling pipes, shown typically at 27, extend laterally across the control surface 16 in a heat exchange relationship with heat-producing machinery located within the wing assembly 13.

A pair of paddle wheels 14 is mounted to the front of the wing assembly 13 for contra-rotation in the direction of arrows 35a. Each paddle wheel 14 is mounted to a main drive shaft 35, the location of the assembly 13 being such that the main drive shafts 35 are substantially coaxial with the direction of flow of the ocean current 20 which urges rotation by impinging on a surface of a plurality of paddle wheel 14 blades shown typically at 50. The main drive shafts 35 each turn a set of bevel gears 17 comprising a main drive gear 31, a lateral idler gear 32 meshing therewith at right angles, an axial idler gear 33 meshing at right angles to the lateral idler gear 32 and substantially coaxially with the main drive gear 31, and a main lateral gear 34 meshing with both the axial idler gear 33 and the main drive gear 31.

The main lateral gears 34 each drive a lateral drive shaft 36, each of which leads into a gear box 37, which is geared to multiply the angular velocity of rotation of a generator drive shaft 39. One of the generator drive shafts 39a has a cooling fan 38 mounted for rotation therewith to direct seawater to the generator 45 for cooling.

Power generated by the generator 45 is directed along an AC cable 41 to a transformer 28 mounted to the transformer support platform 18. Power is stepped up in voltage in the transformer 28 and directed from the transformer 28 along a higher voltage cable 42 to a rectifier 29 mounted to the rectifier support platform 19. Rectified DC power is directed from the rectifier 29 along a DC cable 43 through a power conditioner 44 to an onshore cable 46.

Referring in particular to FIGS. 1 and 3, it can be seen that the barge 11 includes a plurality of buoyancy bags 47, which may be filled with gas through a feed tube 48, thereby enabling the barge 11 to be refloated.

The generator 45 is mounted in a middle of a main upper frame 13, which is shaped like a wing to produce an upward force as the current 20 passes over it. The main upper frame/wing assembly 13 includes cooling tubes 27 running longitudinally through and in close proximity of the gear boxes and bearing oils such that heat produced by the machinery may be readily dissipated.

On either end of the wing are mounted the right angle gear boxes 17, which take the motion of the two paddle wheels 14 and turn that motion through 90°. Inboard of these gear boxes 17, two other gear boxes 37 operate to increase the speed of the shaft 36 so as to make the generator 45 turn at an efficient speed. Attached to the high speed shaft 39a is a fan 38 that circulates cooling air through the alternator/generator 45 and then through the upright booms that connect the wing assembly 13 to the barge 11. Heated air will cool as it flows through a tubular frame of the upright booms and returns to be reheated by the alternator/generator 45. The rigid tubular frame is similar to a lattice boom as used on a crane and is attached at a base to a ship or barge that is beyond its normal commercial use and is gutted of engines, winches, wheel house, and other such apparatus. This platform includes valves that open to the seawater and shall have within the individual holds, inflatable bags or balloons 47 that can be connected to a surface vessel and be individually inflated or deflated in such a manner as to raise or lower the entire apparatus 10 in a controllable manner for such purposes as maintenance or repositioning.

The output power of the alternator/generator 45 passes via flexible cables 41 to a water cooled transformer 28 that steps up the output voltage of the alternator/generator 45 to a transmissible level of voltage (e.g. 66 kV or 132 kV). The output power from the step up transformer 28 is directed to a water cooled bridge rectifier 29, which converts the AC power to DC power, which is cheaper to transmit. The output power is joined to other cables 46 from other like apparatuses 10 and eventually makes its way via submarine transmission cables to a shore base where it can be inverted to 3-phase power and synchronised with land based transmission lines to be fed into the national grid.

FIG. 6 illustrates how several apparatuses 10 may be arranged across the ocean current 20. The figure also illustrates that an apparatus 10 may have more than one power generation means and support means 12 arranged in tandem on a single anchoring means/vessel/barge 11.

The paralleling of multiple sources of power tends to have several of the generating apparatuses 10 motoring off the other apparatuses 10. This can be overcome by sensing the current (and voltage) output of each individual apparatus 10 and raising the level of excitation within the alternator until that generator 45 is at its maximum output.

An optical fiber is incorporated within the submarine transmission cables to enable base station monitoring of apparatuses 10 and control the system as a whole. The generator 45, wing assembly 13, tubular supports of the upright booms, transformer 28/circuit breaker, rectifier 29 and transmission connector modules, are all fitted with a pressure control device, and are filled with nitrogen gas or the like to reduce the effects of corrosion and oxidation. The gas pressure controlling device maintains the internal pressure slightly above ambient pressure (say by 10 kPa) whether the apparatus 10 is operating at 500 meters depth of water or being towed to site at sea level pressure. This internal pressure control will eliminate the differential pressure (such as that cause by tides or storms) across the seals and increase the maintenance intervals of the generating apparatus 10 by reducing sealing pressure and thus wear. Excess pressure may be returned to a high pressure fluid storage vessel.

The paddle wheels 14 (fans or water screws) having paddles/blades 50 are designed to be turned by low speed currents that flow in the order of 5 knots. The paddles/blades 50 extend at about 45 degrees relative to the direction of ocean current flow and are curved so as to more efficiently capture the kinetic energy of the moving water.

As seen in FIGS. 3-5, each paddle wheel 14 can have a hub 60, a first metal tube 61, a second metal tube 62, a first set of radially extending paddles/blades 63 extending between hub 60 and tube 61, and a second set of radially extending paddles/blades 64 extending between tube 61 and tube 62. The hub 60 and tubes 61, 62 are concentrically arranged. The purpose of this outer tube 62 arrangement is to transmit uneven torque and to minimise the effect of impact with other ocean going objects such as ships or whales or the like. The paddles/blades 63 would be not unlike a traditional Australian windmill fan blades and similar to the blades of a traditional Dutch windmill.

Figure 8:
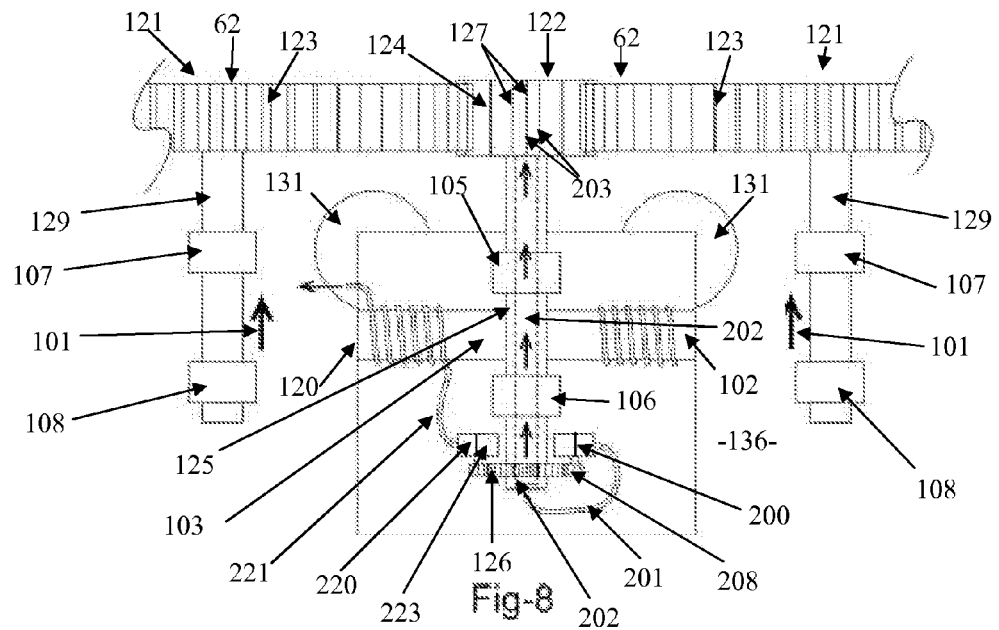
FIG. 8 is a plan view of part of the marine power generation apparatus shown in FIG. 7.
Figure 9:
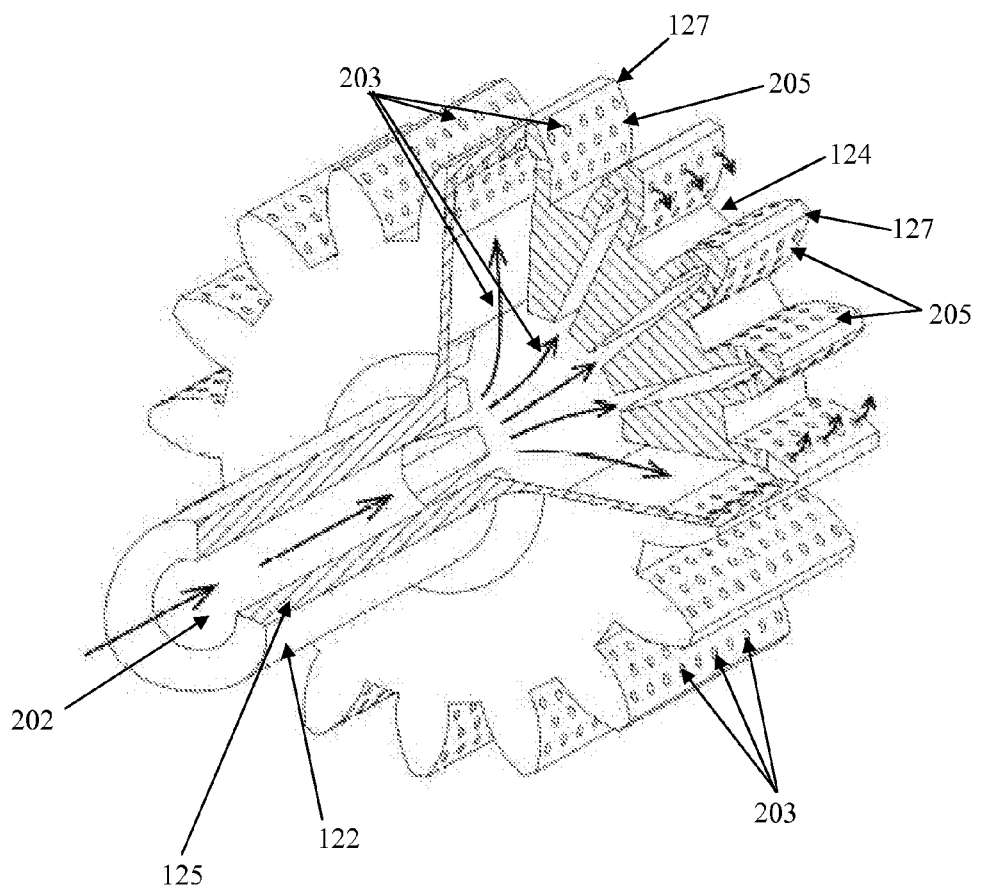
FIG. 9 is a detailed perspective view of part of a shaft assembly of the marine power generation apparatus shown in FIG. 7 (a turbine shaft of which also serves as a rotor shaft of the generator)

Referring now to FIGS. 7-9, there is shown a marine power generation apparatus 100 according to another embodiment of the present invention. Where possible, features of the apparatus 100 that are similar to and found in apparatus 10 will be labeled with the same numerals.

The apparatus 100 includes power generation means 110 operable to generate power when within an ocean current 101, support means 130, anchoring means 140, cooling means, lubricating means and leak prevention means.

The anchoring means 140 is in the form of an anchor vessel 140 much like vessel/barge 11 having its scuttling valves opened to permit flooding and sinking of the barge 11 to sit on the ocean floor 30. The barge 11 includes a plurality of buoyancy bags 47, which may be filled with gas through a feed tube 48, thereby enabling the barge 11 to be refloated. The barge 11 is further anchored to the ocean floor 30 through the use of a conventional anchor 141.

The anchoring means 140 also includes a series of blow tubes 143 that extend from a deck through a hull of the barge 11, the purpose of which is to provide a lifting force by forcing air between a bottom surface of the barge 11 and the ocean floor 30, to assist the buoyancy bags 47 for the initial liftoff of the barge 11 during the floatation process should the barge 11 become settled into a muddy ocean bottom. The design of the barge 11 enables the whole apparatus 100 to be refloated without the need for heavy lift equipment.

The support means 130 includes a framework of frame members, some of which are tubular/hollow. The support means 130 also includes a wing-shaped housing 136 (shown in phantom in FIG. 7) that houses part of the power generation means 110, including a generator 120.

The support means 130 includes a pair of tubular upright frame members 131 (similar to the upright booms of apparatus 10) extending from the deck of the barge 11 to the housing 136. The upright frame members 131 provide personnel access to machinery within the housing 136 by way of open portals 133, internal passages and internal step ladders 134 of the frame members 131 (shown in FIG. 7). Since the portals 133 remain open after the apparatus 100 has been fully submerged, they also potentially allow the influx and efflux of ocean water between the portals 133 and the housing 136.

As can be seen from FIG. 7, the support means 130 supports a transformer 28 and rectifier 29, as described previously.

The power generation means 110 includes a turbine and an electrical generator 120/alternator. The turbine comprises a pair of turbine blade assemblies 121 and a turbine shaft assembly 122.

Each turbine blade assembly 121 is in a paddle wheel type configuration, similar to paddle wheel 14, except that each second metal tube 62 (i.e. circumferential ring) has teeth 123 extending completely around its outer periphery.

The turbine shaft assembly 122 comprises a turbine shaft gear 124 connected to a first end of a hollow turbine shaft 125. The turbine shaft assembly 122 comprises a drive gear 126 connected to a second end of the turbine shaft 125 (see FIG. 8). A region of the turbine shaft 125, intermediate the ends, is connected directly to a rotor 103 of the generator 120. The toothed outer periphery 123 of each second metal tube 62 meshes with teeth 127 of the turbine shaft gear 124 such that the blade assemblies 121 and rotor 103 rotate in unison. The turbine shaft 125 is mounted within the housing 136 by way of bearing blocks 105, 106.

Each turbine blade assembly 121 comprises a mounting shaft 129 extending co-axially with the turbine shaft 125 (see FIG. 8). Each mounting shaft 129 is mounted onto or within the housing 136 by way of bearing blocks 107, 108 for same-direction rotation when placed in an ocean current 30—as shown by the directional arrows of FIG. 7. In this configuration, the turbine blades 50 can be about several meters long and/or wide and the thickness of the turbine blades 50 may be reduced to about 20 mm in thickness.

However, in some embodiments, the turbine blades can be of much greater radial length, e.g. 20 meters in length or even longer. That is, in some embodiments a current-capturing face of the turbine blade assembly can have a diameter of say, 3 meters, 10 meters, 20 meters, 30 meters, 40 meters, 50 meters or even greater. For large diameters, the turbine blade assembly may have further concentrically arranged tubes and sets of blades extending there between.

The lubricating system provides high-pressure ocean water as a lubricant between contacting surfaces of the meshed turbine assemblies 121 and the turbine shaft gear 124. This system is also part of the cooling system as it dissipates heat buildup in the generator 120.

Referring now to FIG. 8, the lubricating system includes a pump 200 having a water inlet and an outlet 201, a swivel coupling 202 that couples the pump outlet 201 to the second end of the hollow turbine shaft 125, and outlets 203 extending from an internal passage 202 of the turbine shaft 125 to contact surfaces 205 of the teeth 127 of the turbine shaft gear 124.

The pump 200 is located within the housing 136 and has a gear 208 that is coupled with and driven by the drive gear 126 of the turbine shaft assembly 122. The pump 200 inlet intakes ocean water, conveys it through the passage 202 of the turbine shaft 125 and through the teeth 127 contact surface 205 outlets 203 at high-pressure (see FIG. 9). The high-pressure water acts as a lubricant between meshing teeth of the turbine blade assemblies 121 and turbine shaft gear 124, and the water is released back into the ocean.

Referring now to FIG. 8, the cooling system comprises a pump 220 having an ocean water inlet and outlet, and a pipe manifold 221 extending from the outlet of the pump 220 and around a stator 102 of the generator 120 such that cooling water located within the pipe manifold 221 is in a heat exchange relationship with the stator 102.

The pump 220 is located within the housing 136 and has a gear 223 that is coupled with and driven by the drive gear 126 of the turbine shaft assembly 122. The pump 220 inlet intakes ocean water, conveys it through the pipe manifold 221 and around the stator 102, and then releases it back into the ocean.

Figure 8A:
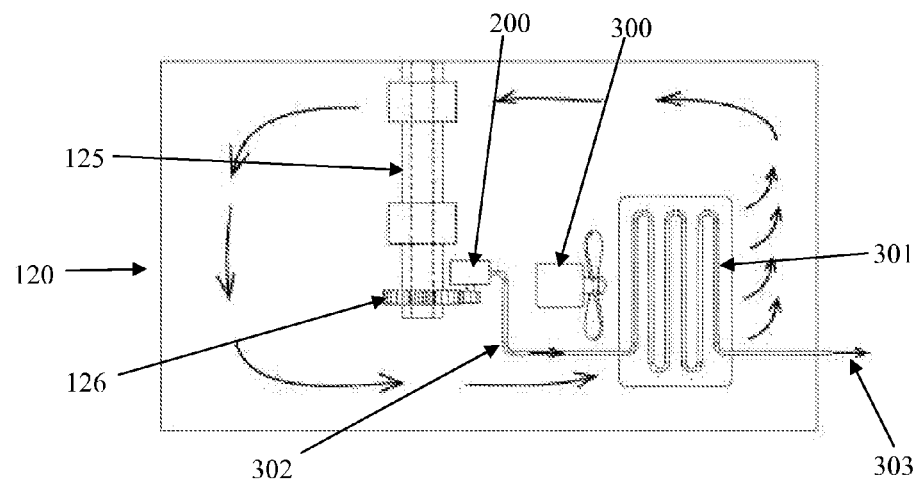
FIG. 8a is a plan view of that shown in FIG. 8 except showing a different cooling system.

Referring now to FIG. 8a, the cooling system can alternatively or additionally comprises a pump 220 having an ocean water inlet and outlet, and a pipe 302 extending from the outlet of the pump 220 through a radiator 301 and out of the housing 136.

The pump 220 is located within the housing 136 and has a gear that is coupled with and driven by the drive gear 126 of the turbine shaft assembly 122. The pump 220 inlet intakes ocean water, conveys it through the pipe 302 and radiator 301 and then releases it back into the ocean. A fan 300 of the cooling system circulates radiator-cooled air with the generator 120 housing.

Referring now to FIG. 7, the leak prevention means includes float switches 270 located within and spaced along the upright frame members 131 and electrically coupled to a source of pressurised gas (not shown), such as air or nitrogen, for pressurising the housing 136 should an accidental influx of water occur. Upon sensing ocean water within the upright frame members 131, the float switches 270 can trigger pressurisation of the housing 136 with gas and force the water level down the upright frame members 131 towards the portals 133.

The purpose of the leak prevention means is to provide a signal to increase air pressure within the housing 136 if the water level gets dangerously high, or if generator 120 flooding is imminent, then the generator 120 can be safely shut down and an alarm sent to central control.

The apparatus 100 as shown in FIGS. 7 to 9 is designed to be set on the ocean floor 30 such that the turbine shaft 125 is aligned with the direction of flow of the current, and the turbine blade assemblies 121 are generally set at right angles to the direction of the water flow. The turbine blades 50 are curved to maximise the waters thrust on the blades 50 and are set at about 45 degrees relative to the axis of the turbine shaft 125. The water passing the turbine blades 50 imparts a force on the blades 50 that effects the blades 50 in two directions. The first effect (first component of force) is axial and tends to force the blades 50 downstream of the current. This effect is neutralised by the support 130 and anchoring 140 means as a whole.

The second component of force is radial, and when all the turbine blades 50 are taken into account provides a circular effort around an axis of the turbine shaft 125. The net effect is to rotate the turbine shaft 125 that in turn provides the rotational energy for the alternator 120.

One important aspect of the turbine design is the orientation and attachment to the driven turbine shaft 125 and design shape of the turbine blades 50. Most submarine generator blades have the appearance of aircraft propellers and, as has been demonstrated in the past, are prone to failure when used in a marine application. The reason for this is that seawater is approximately 784 times more dense than air. This means that a propeller used in a submarine application in a 5 knot current would need to be constructed to withstand a flow of air in the order of several thousand knots. The advantage of the present design is that the width of the blades 50 and their shaft attachment length can be several meters and the blade 50 thickness can be reduced to approximately 20 mm thickness.

This system allows increase in size of structure for larger generators without the squaring of the dimensions of structure and subsequent loss of useable current flow over the working surface of the blades, i.e. to increase the strength of an aircraft propeller to withstand the same force of water, the blade and hub thickness would be such that the drag on the whole structure and anchor system would increase exponentially, and the rotational (generator) force on the blades would decrease exponentially.

Also, propeller-type blades are designed for high speed in a low viscosity fluid environment such as air, and when viewed from an axial direction, cover about 20% of the cross sectional area. This implies that, at the velocities of the huge Guyra currents, approximately 5 knots, there is a lot of energy not being captured and utilised.

The turbine blade assembly 121 of the present invention consists of radially mounted blades 50 that can capture about 95% of the available passing current, due to their coverage of the cross sectional area, with a gear toothed circumferential tube (ring) 123 extending around the outside of the blades 50. The effect of this is to translate the rotating torque effect away from inner members of the blades and the turbine shaft 125. The force on the blades is converted to tension and compression forces within the toothed circumferential ring 123. This is a much cheaper option to construct than to translate the rotational force through the turbine blades and shaft.

As mentioned above, the design allows for a current-capturing face of the turbine blade assembly to have large diameters of 5, 10, 20 or 50 meters or even greater. For large diameters, the turbine blade assembly may have further concentrically arranged tubes and sets of blades extending there between.

Figure 10:
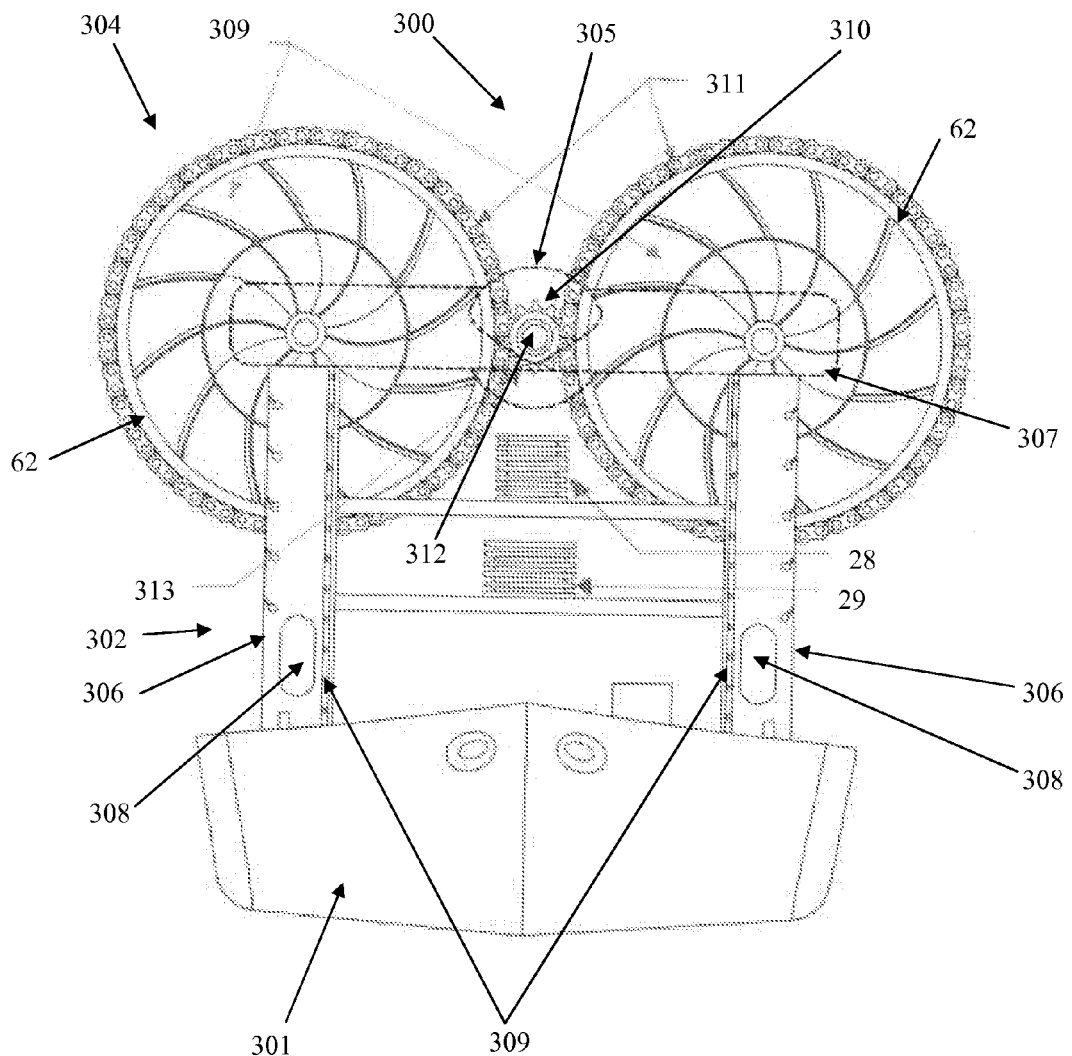
FIG. 10 is an end view of a marine power generation apparatus according to an alternative embodiment of the present invention.

In FIG. 10 there is shown an end view of a marine power generation apparatus 300 according to an alternative embodiment of the present invention. The apparatus 300 includes anchoring means 301 in the form of an anchor vessel 301 much like vessel/barge 11 shown in FIG. 3.

The support means 302 includes a framework of frame members, some of which are tubular/hollow. The support means 302 also includes a wing-shaped housing 303 (shown in phantom in FIG. 10) that houses part of the power generation means 304, including a generator 305.

The support means 302 includes a pair of tubular upright frame members 306 (similar to the upright booms of apparatus 10) extending from the deck of the barge 301 to the housing 307. The upright frame members 306 provide personnel access to machinery within the housing 307 by way of open portals 308, internal passages and internal step ladders 309 of the frame members 306. Since the portals 308 remain open after the apparatus 300 has been fully submerged, they also potentially allow the influx and efflux of ocean water between the portals 308 and the housing 307.

As can be seen from FIG. 10, the support means 302 supports a transformer 28 and rectifier 29, as described previously.

The power generation means 304 includes a turbine and an electrical generator 305/alternator. The turbine comprises a pair of turbine blade assemblies 309 and a turbine shaft assembly 310.

Each turbine blade assembly 309 is in a paddle wheel type configuration, similar to paddle wheel 14, except that each second metal tube 62 (i.e. circumferential ring) has multiplex drive chains 311 extending completely around its outer periphery.

The turbine shaft assembly 310 comprises a turbine shaft gear 311 connected to a first end of a hollow turbine shaft (obscured). The multiplex drive chains 311 of each second metal tube 62 meshes with the sprocket teeth 313 of the turbine shaft gear 312 such that the blade assemblies 309 and a rotor (not shown) rotate in unison in much the same way as shown in FIG. 8.

Figure 11:
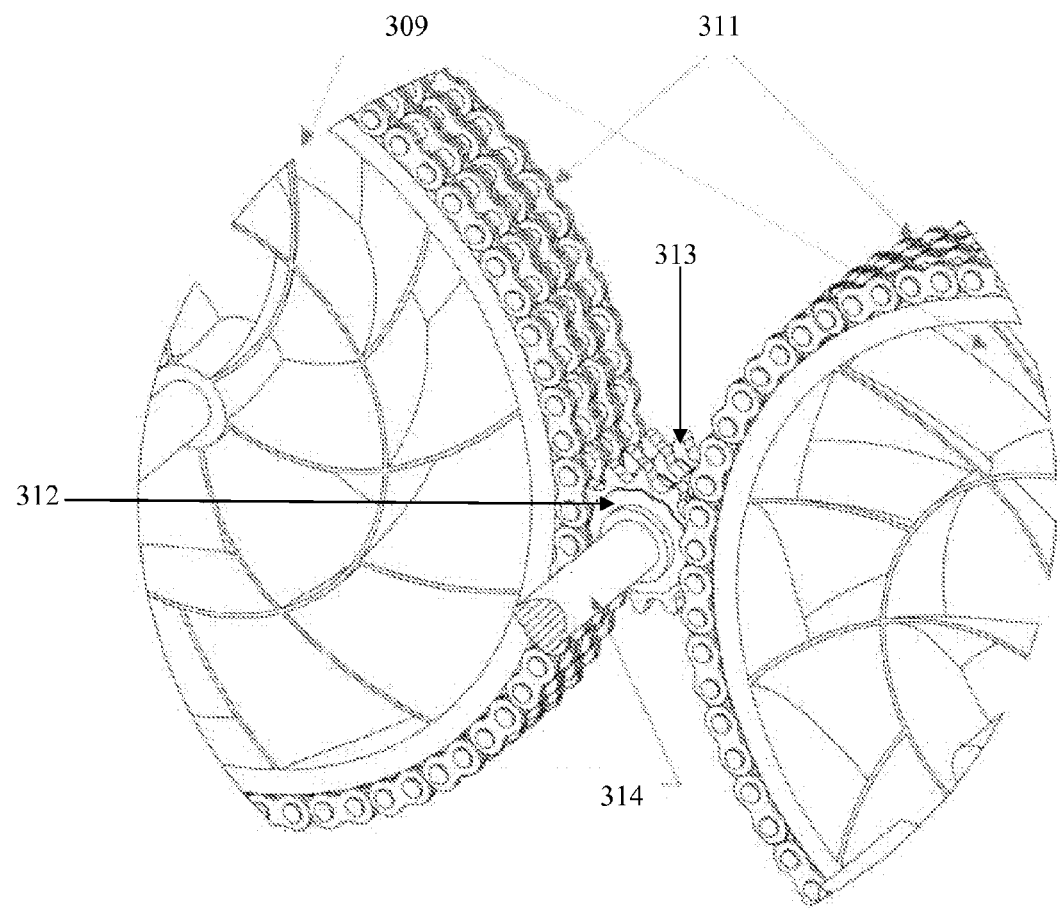
FIG. 11 is a detailed perspective view of part of a shaft assembly of the marine power generation apparatus shown in FIG. 10.

In FIG. 11 there is shown a detailed perspective view of part of a shaft assembly 310 of the marine power generation apparatus 300 shown in FIG. 10. In this Figure, it may be more clearly seen that the multiplex drive chains 311 on the outer periphery of the turbine blade assembly 309 mesh with the teeth 313 on the turbine shaft gear 312. Rotation of the turbine blade assemblies 309 in the ocean current therefore causes rotation of the turbine shaft gear 312, which in turn causes rotation of the turbine shaft 314. The opposite end of the turbine shaft 314 is connected to a generator (not shown) in much the same manner as that shown in FIG. 8.

Figure 12:
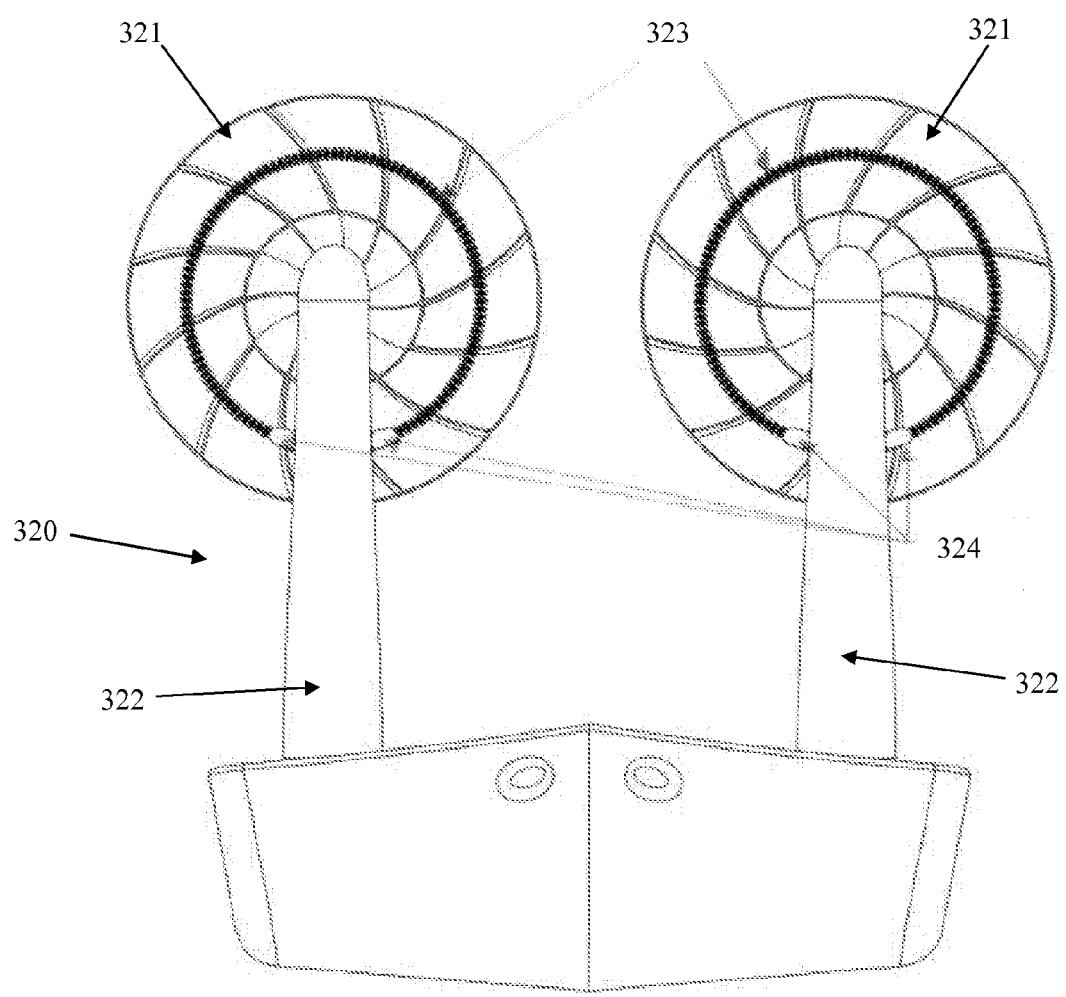
FIG. 12 is an end view of a marine power generation apparatus according to an alternative embodiment of the present invention.

In FIG. 12 there is shown an end view of a marine power generation 320 apparatus according to an alternative embodiment of the present invention. This apparatus 320 is similar in many ways to that shown in FIG. 10 except for a number of important distinctions. Firstly, the apparatus 320 is provided with a pair of turbine blade assemblies 321 mounted to airfoil shaped support means 322, which serves as a housing for a portion of the power generation means 323.

Each of the turbine blade assemblies 321 is provided with a ring of magnets 323 located equidistant from the hub (obscured). Stator windings 324 are mounted to the support means 322 such that, as the turbine blade assemblies 321 rotate in the ocean current, the ring of magnets 323 rotates adjacent the stator windings 324. In doing so, electrical power is generated in the stator windings 324.

Figure 13A:
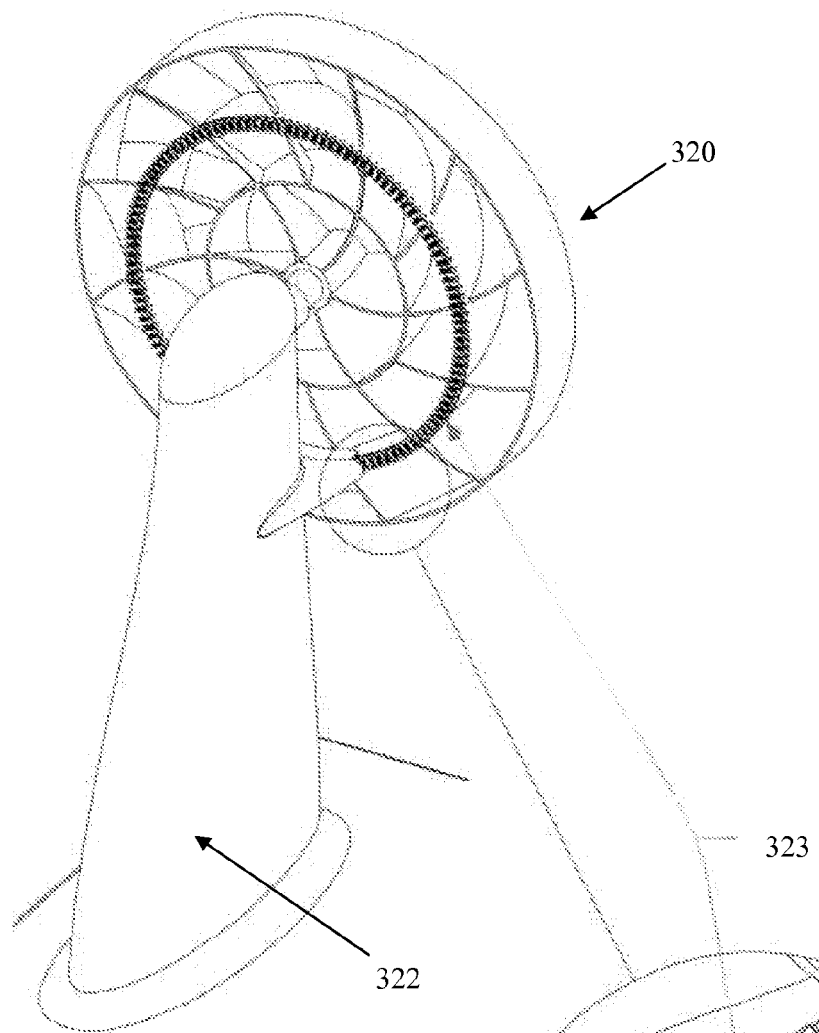
FIG. 13a is a perspective view of part of the marine power generation apparatus shown in FIG. 12.

In FIG. 13a, a perspective view of part of the marine power generation apparatus 320 shown in FIG. 12 is illustrated. The airfoil shape of the support means 322 may be more clearly seen, with the narrow edge of the air foil being positioned to face the ocean current, and therefore minimise the surface area of the support means 322 exposed to the current. This serves to increase the overall stability of the apparatus 320.

Figure 13B:
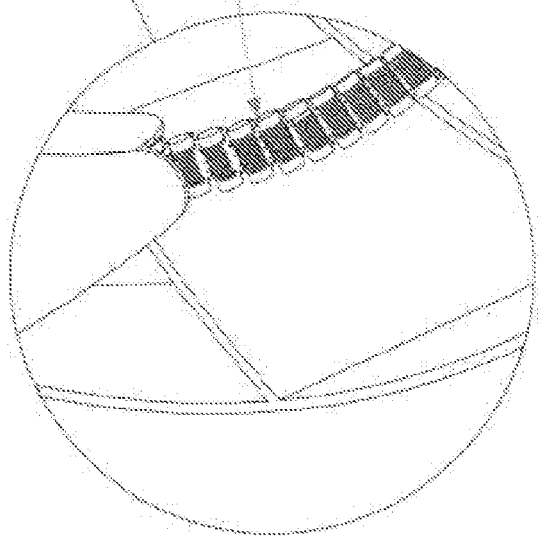

In FIG. 13b, a detailed perspective view of part of the marine power generation apparatus 320 of FIG. 13a is shown. In this Figure, the concentric ring of magnets 323 fixed to the turbine blade assembly 321 is more clearly illustrated.

Figure 14A:
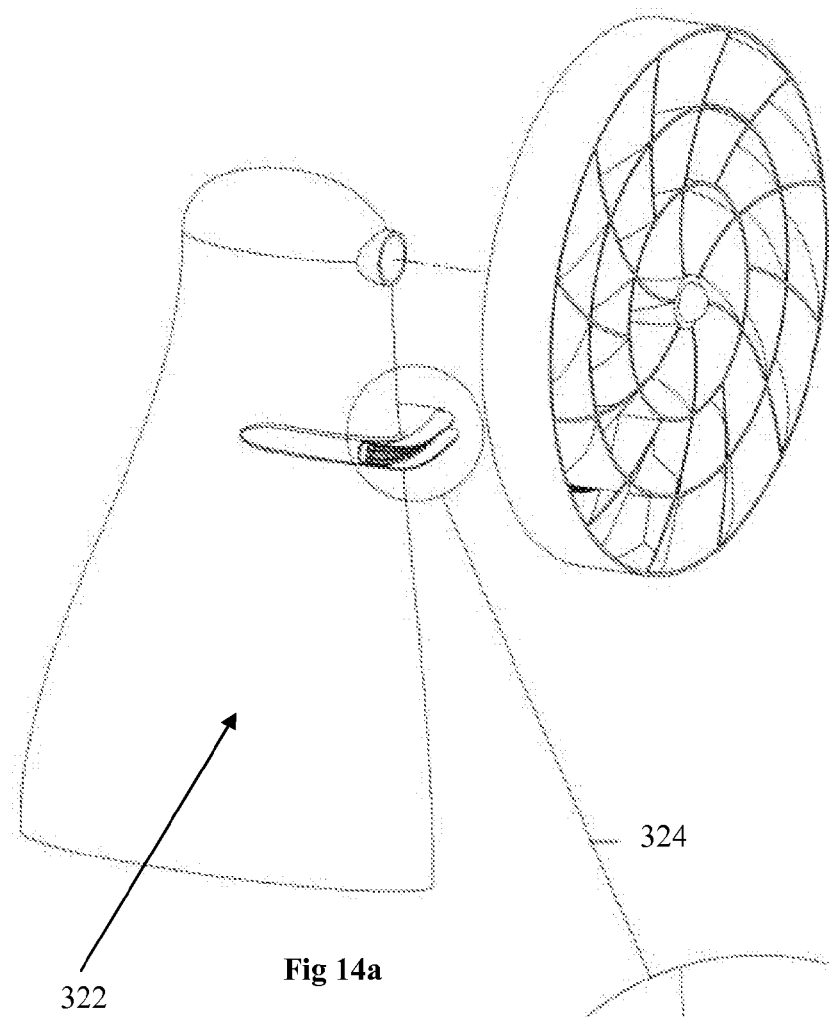
FIG. 14a is a perspective view of part of the marine power generation apparatus shown in FIG. 12.
Figure 14B:
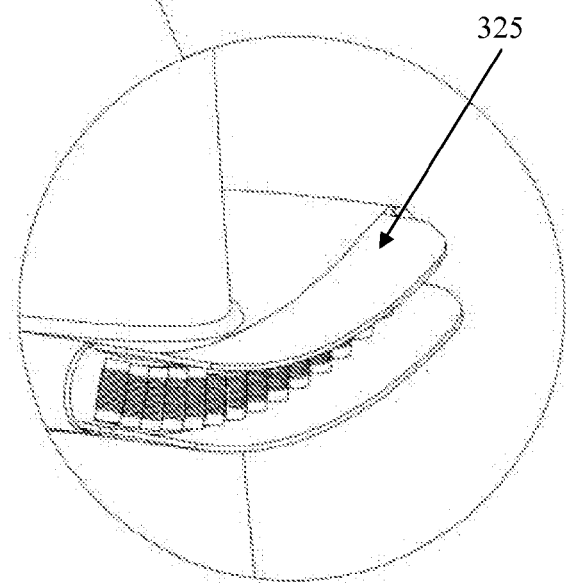

In FIGS. 14a and 14b, the stator windings 324 shown in FIG. 12 may be more clearly seen. The stator windings 324 are mounted to the support means 322 in a stator housing 325. Those skilled in the art will appreciate that the present invention may be susceptible to variations and modifications other than those specifically described. It will be understood that the present invention encompasses all such variations and modifications that fall within its spirit and scope.

The invention claimed is:
1. A marine power generation apparatus for generating power from an ocean current, said apparatus comprising:
   a turbine operable to generate power when within an ocean current, the turbine comprising one or more turbine blade assemblies comprising
      a hub,
      a set of turbine spokes, stays or blades extending radially from the hub, and
      a circumferential ring extending around and connected to an outer periphery of the set of turbine spokes, stays or blades;
   one or more magnetic means mounted thereto;
   wherein the one or more turbine blade assemblies are mounted for rotation when placed in an ocean current such that rotation of the one or more turbine blade assemblies causes the one or more magnetic means to pass adjacent to power generation means adapted to generate power from the one or more magnetic means; and anchoring means for anchoring the turbine relative to a floor of the ocean and in alignment with the ocean current, the anchoring means connected to and supporting the turbine and positioned below the turbine in use, and the anchoring means comprising a floodable vessel having variable buoyancy means operable for refloating the apparatus, and wherein the floodable vessel is formed to be positioned on the floor of the ocean during use.

2. A marine power generation apparatus according to claim 1, wherein the magnetic means comprise a plurality of magnets.

3. A marine power generation apparatus according to claim 2, wherein the magnets are permanent magnets, electrically-induced magnetic poles or a combination thereof.

4. A marine power generation apparatus according to claim 1, wherein the power generation means comprises one or more static windings.

* * * * *